US005803018A

United States Patent [19]

Liou

[11] Patent Number: 5,803,018

[45] Date of Patent: Sep. 8, 1998

[54] PORTABLE KNOCK-DOWN PIGEON CAGE

[76] Inventor: Jong-Shiaw Liou, No. 9-1, Yu-Tsuo Chuang, Shi-Kou Shiang, Chia-I Hsien, Taiwan

[21] Appl. No.: 926,445

[22] Filed: Sep. 10, 1997

[51] Int. Cl.[6] .................... A01K 31/08

[52] U.S. Cl. .................... 119/461; 119/474; 119/498

[58] Field of Search .................... 119/461, 462, 119/474, 498, 458

[56] References Cited

U.S. PATENT DOCUMENTS

| | | | |
|---|---|---|---|
| 3,292,582 | 12/1966 | Rubricius | 119/458 |
| 4,319,545 | 3/1982 | Sou | 119/474 |
| 5,010,848 | 4/1991 | Rankin | 119/461 |
| 5,452,681 | 9/1995 | Ho | 119/498 |
| 5,522,344 | 6/1996 | Demurjian | 119/474 |
| 5,549,073 | 8/1996 | Askins et al. | 119/461 X |
| 5,626,098 | 5/1997 | Askins et al. | 119/461 X |

*Primary Examiner*—Terry Lee Melius
*Assistant Examiner*—Yvonne R. Abbott
*Attorney, Agent, or Firm*—Browdy and Neimark

[57] ABSTRACT

A portable knock down pigeon cage for easy transportation of homing pigeons is made up a top roof, a bottom base, a pair of foldable fences and a pair of lateral side walls. The foldable fences are pivotally engaged with the top roof and the lateral side walls are pivotally engaged with the bottom base and can be releasably engaged with the top roof so that the cage can be easily expanded when the top roof is pulled upwardly and the side walls are erected to engage with the top roof, and the cage can be easily knocked down by simply pushing down the lateral side walls. The cage is provided with a drawable waste collecting board in the bottom base so as to make the cleaning of the cage with ease.

1 Claim, 4 Drawing Sheets

46

5

4

51

2

3

1

13

45
47
52
1B
5
51
40
42
44
43
4
1A
41
46
6
3
31
2
21
22
20A
23
1C
30
1
14
12
11
13
32

2
5
4
1
3

4
1
5
3
13
2

PORTABLE KNOCK-DOWN PIGEON CAGE

BACKGROUND OF THE INVENTION

The present invention relates to a portable knock-down pigeon cage for easy transportation of homing pigeons to a remote place for release in a competition or training. The cage is equipped with a top roof ,a bottom base and a pair of foldable fences that are pivotally engaged with the top roof as well as the bottom base and a pair of lateral side walls that are pivotally engaged with the bottom base. The side walls can be erected and engaged with the top roof when the cage is to be expanded and be pushed down when the cage is to be collapsed for storage.

Pigeons raising has been widely regarded as a sports for hundred years in many parts of the world. Pigeons are domicile in nature and are easily trained for competition in long distance flight after they have been nurtured and trained as homing pigeons for some time. In many areas of the world, homing pigeons are transported long distance to remote areas and then released so that they can fly back to their homes in days, weeks, even months for competition The homing pigeons can make it because of their natural superior sense of orientation in flying. So, there are many kinds of pigeon cages have been designed and used to effect such transportion of pigeons all over the world. However, the conventional pigeon cages have the following disadvantages:

1. the prior art pigeon cages used in a great quantity are integrally made ,so they are not easily stored and occupied in large space and are often scattered randomly, making the environment dirty and in such a mess.
2. the prior art pigeon cages are not foldable so they take up a large volume in delivery, making the transportation cost relatively high.
3. such prior art pigeon cages are integrally made and are not provided with waste collecting board, and pigeon droppings are easily scattered all over the cage, making the pigeons subject to contagion of diseases readily.

SUMMARY OF THE INVENTION

Therefore, the primary object of the present invention is to provide a portable knock-down pigeon cage for easy and comfortable transportation of pigeons in one aspect and the cages are easily folded into compact size so that they can be stored in small volume in another aspect.

Another object of the present invention is to provide a portable knock down pigeon cages which can be stored in larger number so as to cut down the cost of delivery of the cages in economical consideration.

One further object of the present invention is to provide a knock down pigeon cage which is equipped with a waste collecting board and a net-like board at the bottom base so as to make the pigeon droppings easily collected, making the pigeons to be confined in a better and cleaner space when transported in a long distance.

DETAILED DESCRIPTION OF THE PREFERRED EMBODIMENT

Figures 1, 1A, 1B, 1C:
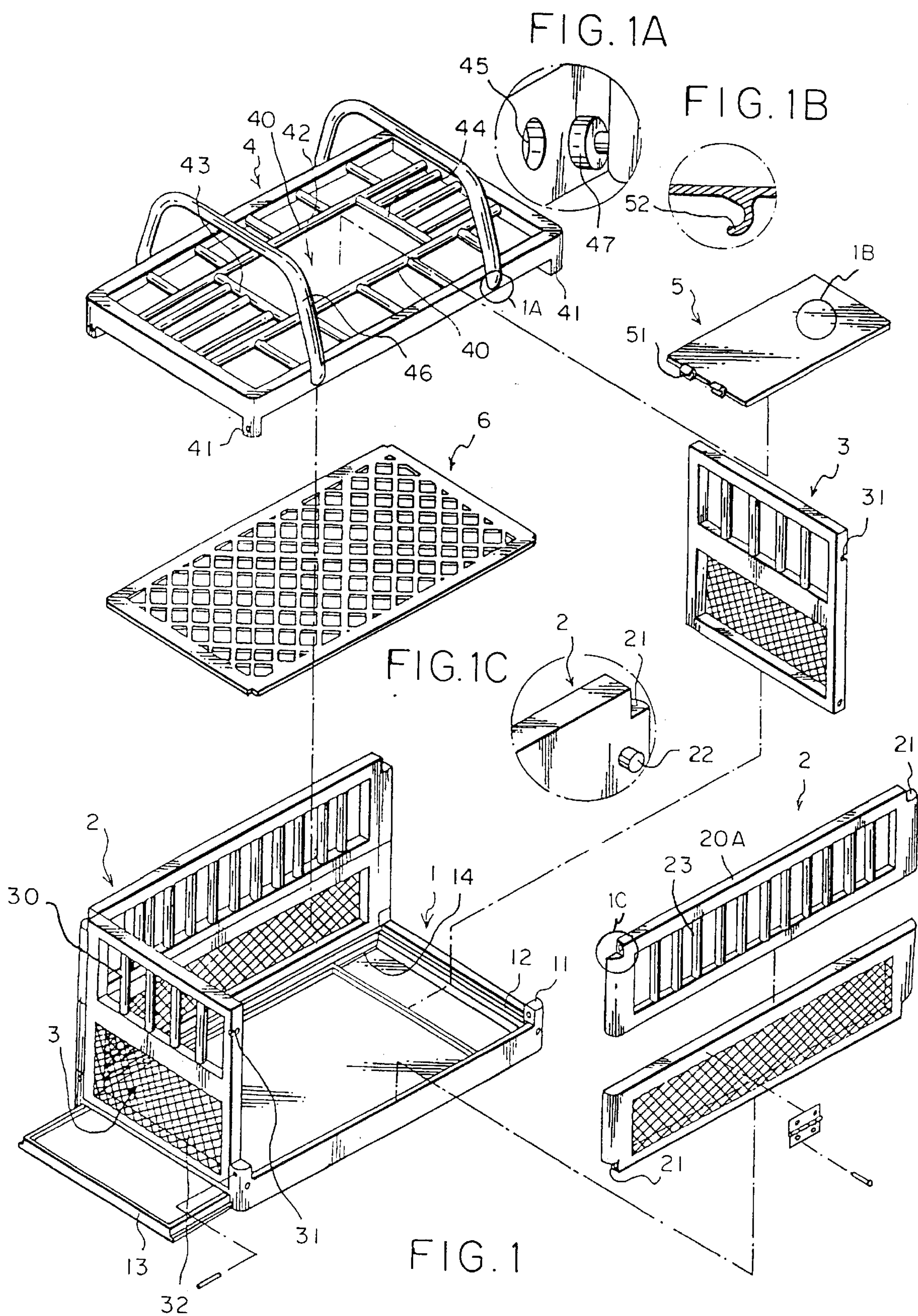
FIG. 1 is a perspective diagram showing the exploded components of the present invention.
FIG. 1A is an enlarged diagram showing the securing of the handle to the sides of the top roof of the pigeon cage.
FIG. 1B is an enlarged diagram showing the way of the handles of the cage to be secured to the top roof.
FIG. 1C is a diagram showing the way of the cover plate to be secured to the top roof.

Referring to FIG. 1, the improved portable pigeon cage is comprised of a bottom base 1, a pair of longitudinal foldable fences 2, a pair of lateral side walls 3, a top roof 4, a cover plate 5 and a net-like board 6.

The bottom base 1 rectangular in shape is provided with a slide track 14 defined on each longitudinal flangd inner side thereof so as to permit a waste collecting board 13 to be removably attached to the bottom base 1. A recess 12 is defined on each lateral flanged side of the bottom base 1. At each corner of the bottom base is disposed a vertical protrusion stud 11.

Each of the foldable fences 2 is made up of an upper portion 20A and a lower portion 20B that are hinged together for folding purpose. The upper portion 20A is a window provided with a plurality of parallel bars 23 and there are two right-angle cuts 21 defined at the upper right and left corner of the upper portion 20A. The lower portion 20B is also a window provided with a screen 24 and a pair of identical cuts 21 defined at the lower left and right comers. On the inner side adjacent each of the upper right and left cuts 21 of each upper portion 20A is provided with a protruded retaining rod 22.

Each side wall 3 provided with parallel bars 30 on the upper portion and a screen 32 on the lower portion thereof has a locking groove 31 at each upper end of each longitudinal side thereof, in correspondence to each retaining rod 22 of the upper portions 20A of the foldable fences 2.

The top roof 4 is a bracket provided with a downwardly protruded rod 41 at each corner thereof and has a central opening 42 encircled by two longitudinal bars 40 and two lateral bars 43, 44. On each longitudinal side of the roof bracket 4 are disposed round holes 45 for the attachment of handles 46 each provided with a locking member 47 at each end thereof.

The cover plate 5 of a rectangular board has a pair of hinge hooks 51 at one lateral side and a locking member 52 disposed near the opposite side thereof.

The net-like board 6 mounted onto the bottom base 1 by engaging the lateral edges with the recesses 12 on the lateral flanged sides of the bottom base 1 in such a manner that the waste collecting board 13 is movable under the net-like board 6.

Figure 2:
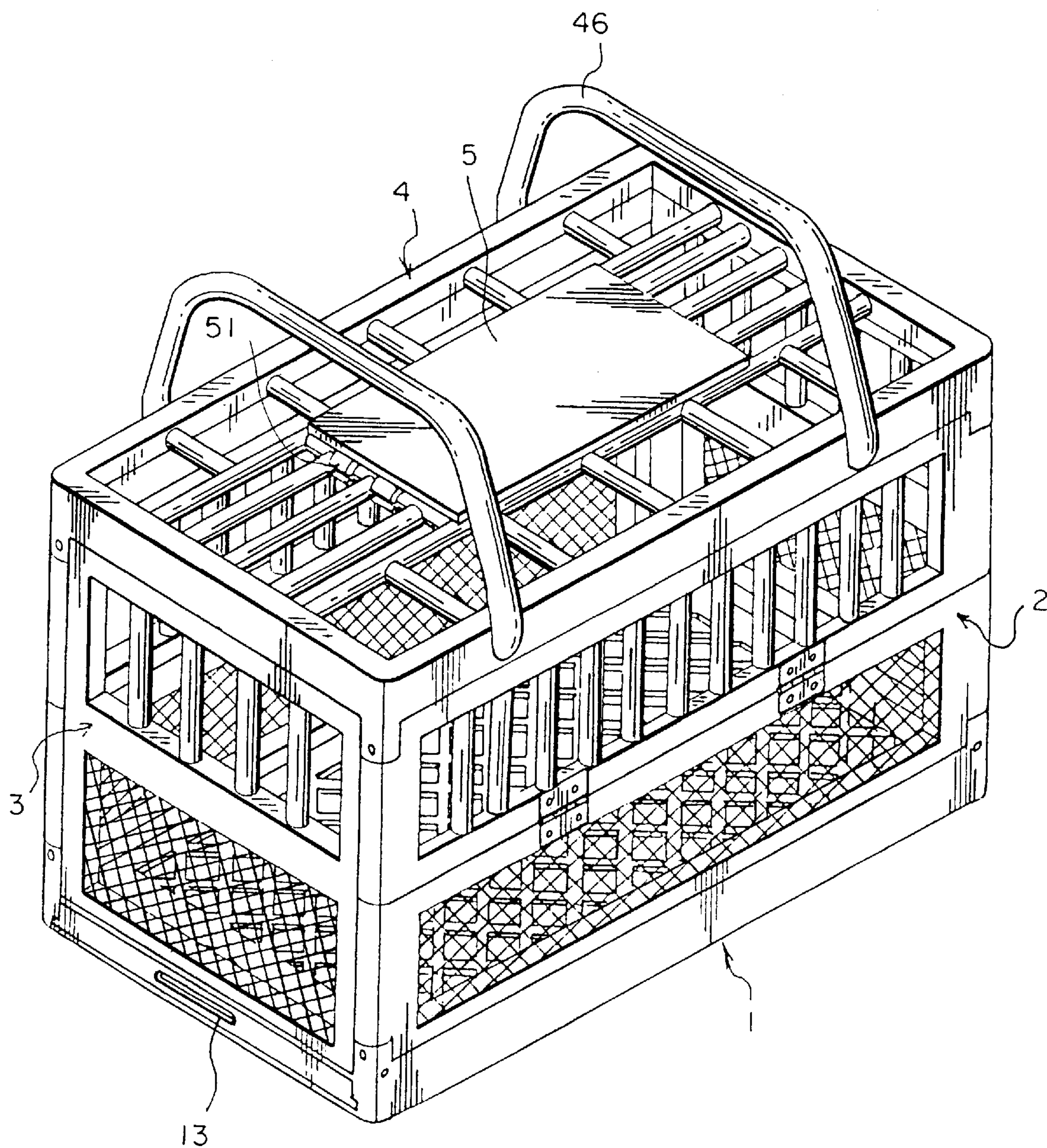
FIG. 2 is a diagram showing the expanded pigeon cage of the present invention.

In assembly, the right-angle cuts 21 of the lower portion 20B of the foldable fences 2 are placed in alignment with the protrusion studs 11 of the bottom base 1 and are pivotally secured thereto. The right-angle cuts 21 of the upper portions 20A of the foldable fences 2 are put in pivotal engagement with the protruded rods 41 of the top roof 4 so as to make the top roof 4 foldable with respect the fences 2. Then, the side walls 3 are pivotally secured to each lateral side of the bottom base 1 between a pair of the protrusion studs 11 respectively so that the side walls 3 can be foldably operated. The pivots of the side walls 3 are located at a lower position that the pivots of the foldable fences 2 on the protrusion rods 11. Next, the cover plate 5 is pivotally mounted onto the top roof 4 by way of the hinge hooks 51 engaged with the lateral bar 43, with the locking member 52 engaged with the lateral bar 44 so as to close up the opening 42 of the top roof 4. The net-like board 6 is placed in position by way of the recesses 12, as shown in FIG. 2.

Figure 3B:
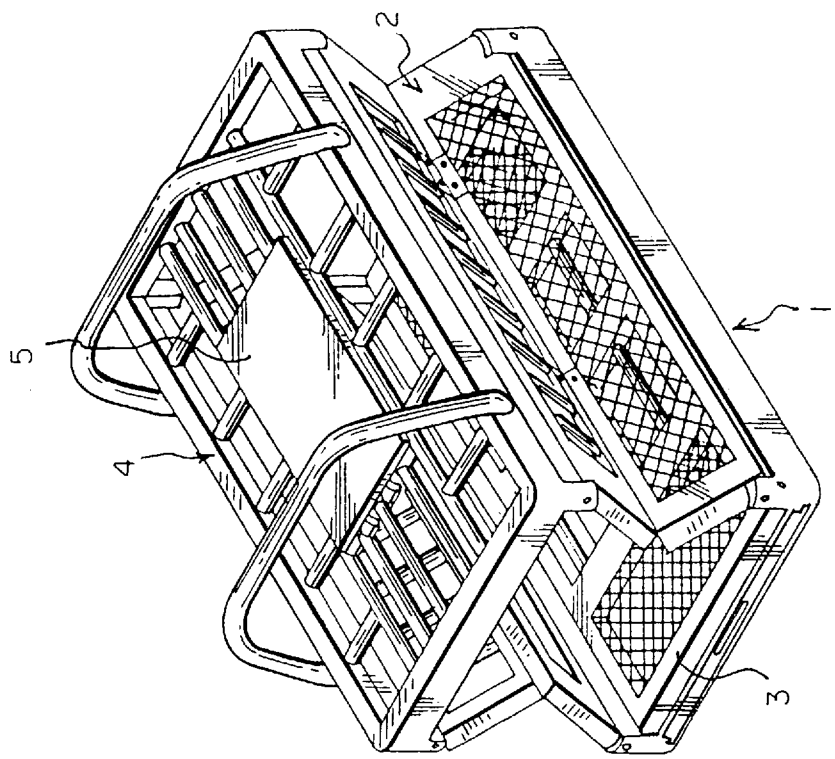
FIG. 3B is a diagram showing the folded cage being expanded for use.
Figure 3A:
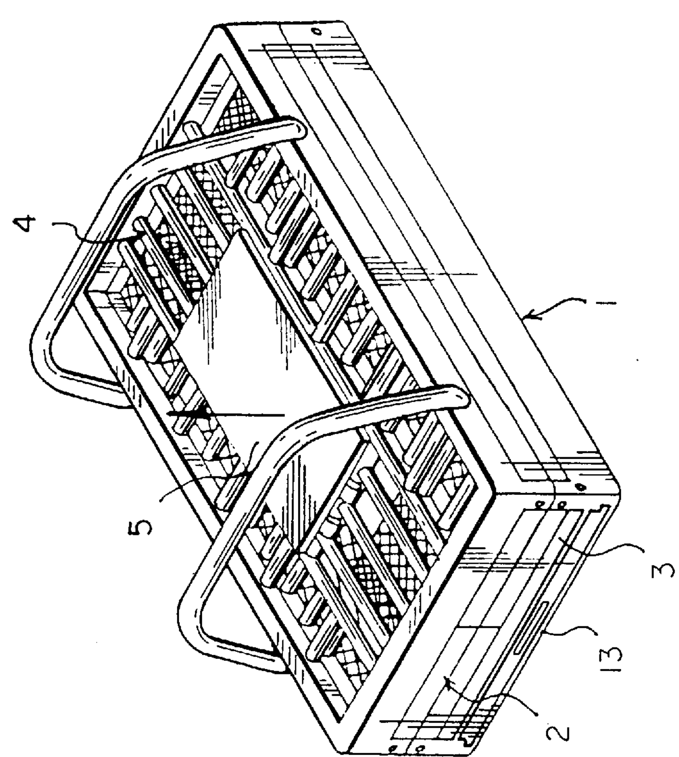
FIG. 3A is a diagram showing the folded cage to be expanded.
Figure 4B:
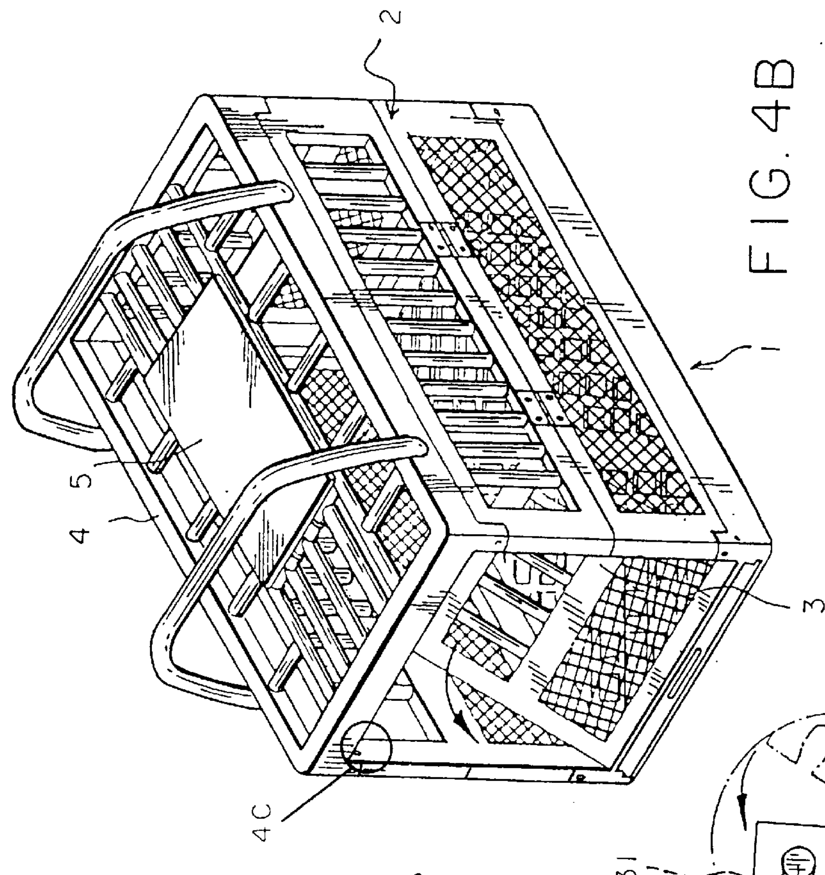
FIG. 4B is a diagram showing the folded walls being erected in operation.
Figure 4C:
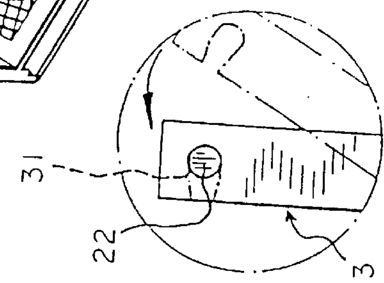
FIG. 4C is an enlarged diagram showing the retaining of the side wall to the longitudinal side of the top roof.
Figure 4A:
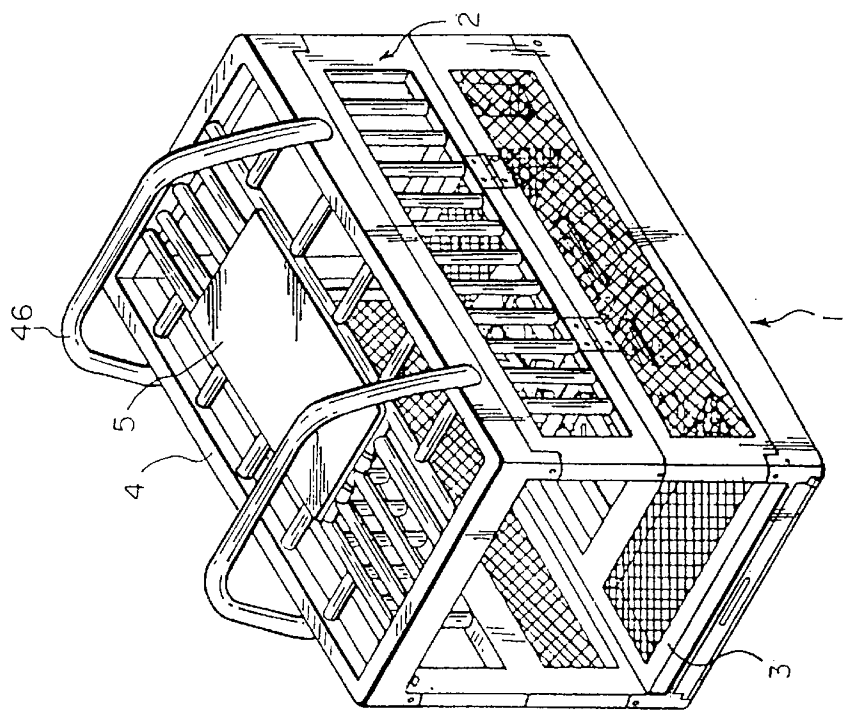
FIG. 4A is a diagram showing the side walls of the cage being folded flat.

The foldable fences 2 are disposed between the top roof 4 and the bottom base 1 so that the folded cage can be automatically expanded into a box when a person pull the case upwardly by the handles 46 of the top roof 4, as shown in FIG. 3. The side walls 3 are afterwards pulled outwardly to erect with the locking grooves 31 of the side walls 3 engaged with the retaining rods 22 of the foldable fences 2 so that the side walls 3 can support the foldable fences 2 in place, as shown in FIG. 4, preventing the foldable fences 2 from collapse. A pigeon can be placed into the cage for transportation via the opening 42 of the cage by removal of the cover plate 5 and then the pigeon is confined in the cage with the cover plate 5 attached to the top roof 4 again. The pigeon droppings dropped via the net-like board 6 can be collected in the waste collecting board 13 which can be readily pulled outwardly for cleaning.

To make the pigeon cage collapsed, the side walls 3 are pushed inwardly to disengage the retaining rods 22 of the foldable fences 2 from the locking grooves 31 of the side walls 3 and are put flat on the bottom base 1. Afterwards, the foldable fences 2 are folded at their hinged middles so that the foldable fences 2 and the top roof 4 are sequentially placed on top of the side walls 3 and the bottom base 1. At last, the handles 4 6 are detached from the top roof 4 to permit the cage to be flatly received.

I claim:

1. An improved foldable pigeon cage for transportation of homing pigeons, comprising:

a bottom base;

a pair of longitudinal foldable fences pivotally engaged with said bottom base;

a pair of lateral side walls pivotally secured to the lateral sides of said bottom base;

a top roof with which being engaged said foldable fences being provided with a central opening;

a cover plate pivotally located at said central opening for closing the same up; and a net-like board removably mounted onto said bottom base;

a waste collecting board removably engaged with said bottom base under said net-like board for collecting pigeon droppings;

said bottom base rectangular in shape being provided with a slide track on each longitudinal flanged inner side thereof so as to permit said waste collecting board to be removably attached to the bottom base;

a recess being defined on each lateral flanged side of said bottom base; at each corner of said bottom base being disposed a vertical protrusion stud;

each of said foldable fences being made up of an upper portion and a lower portion that being hinged together for folding purpose; said upper portion being a window provided with a plurality of parallel bars with two right-angle cuts defined at the upper right and left corner of said upper portion; said lower portion being also a window provided with a screen and a pair of right angle cuts defined at the lower left and right corners; on an inner side adjacent each of said upper right and left cuts of each upper portion being provided with a protruded retaining rod;

each side wall provided with parallel bars on the upper portion and a screen on the lower portion thereof having a locking groove at each upper end of each longitudinal side thereof, in correspondence to each retaining rod of the upper portions of the foldable fences;

said top roof being a bracket provided with a downwardly protruded rod at each corner thereof and having a central opening encircled by two longitudinal bars and two lateral bars; on each longitudinal side of said roof of the bracket being disposed round holes for the attachment of handles each provided with a locking member at each end thereof;

said cover plate of a rectangular shape having a pair of hinge hooks at one lateral side and a locking member disposed near the opposite side thereof;

said net-like board mounted onto the bottom base by engaging the lateral edges with the recesses on the lateral flanged sides of said bottom base in such a manner that the waste collecting board being movable under said net-like board;

whereby in assembly, said right-angle cuts of said lower portion of said foldable fences being placed in alignment with the protrusion studs of said bottom base and being pivotally secured thereto; said right-angle cuts of said upper portions of said foldable fences being put in pivotal engagement with said protruded rods of said top roof so as to make said top roof foldable with respect said fences; then, said side walls being pivotally secured to each lateral side of said bottom base between a pair of the protrusion studs respectively so that said side walls can be foldably operated; said pivots of said side walls being located at a lower position than that of the pivots of the foldable fences on the protrusion rods; next, said cover plate being pivotally mounted onto said top roof by way of the hinge hooks engaged with one of the lateral bars, with the locking member engaged with said one of the lateral bars so as to close up the opening of said top roof; said net-like board being placed in position by way of the recesses.

* * * * *